No. 784,756. PATENTED MAR. 14, 1905.
C. J. PULT.
FLORIST'S BENCH.
APPLICATION FILED MAY 24, 1904.
3 SHEETS—SHEET 1.
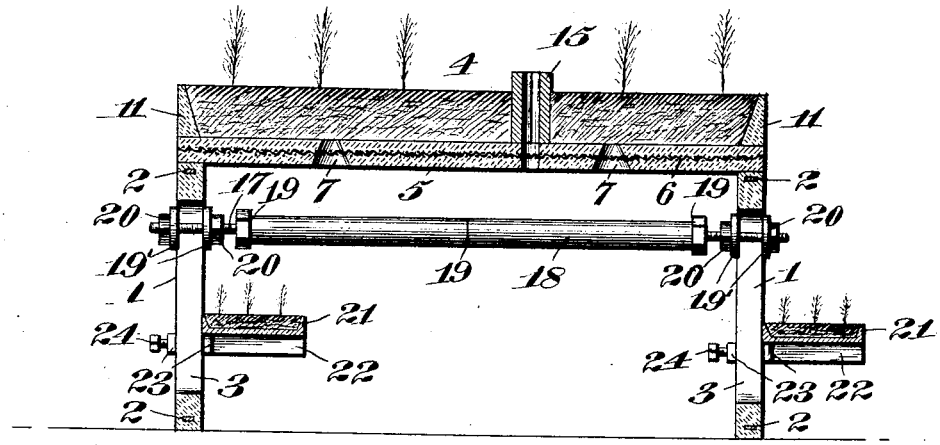
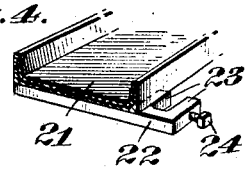
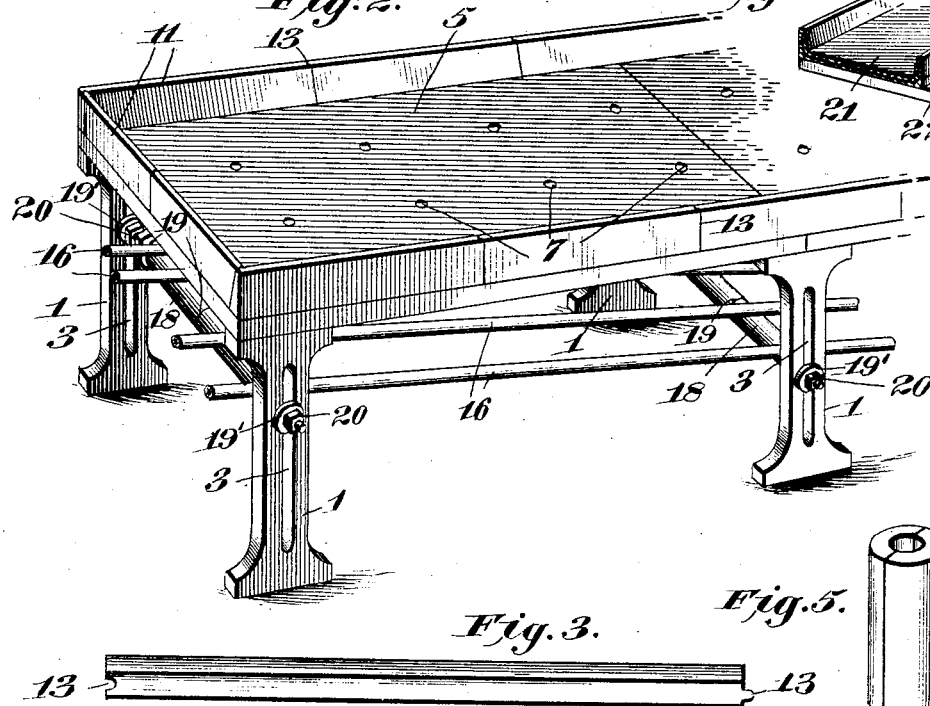
WITNESSES:
Elmer Seavey
Sarah V. Lockwood
INVENTOR
Casper J. Pult
By
Geo. A. Hamlin
His Attorney

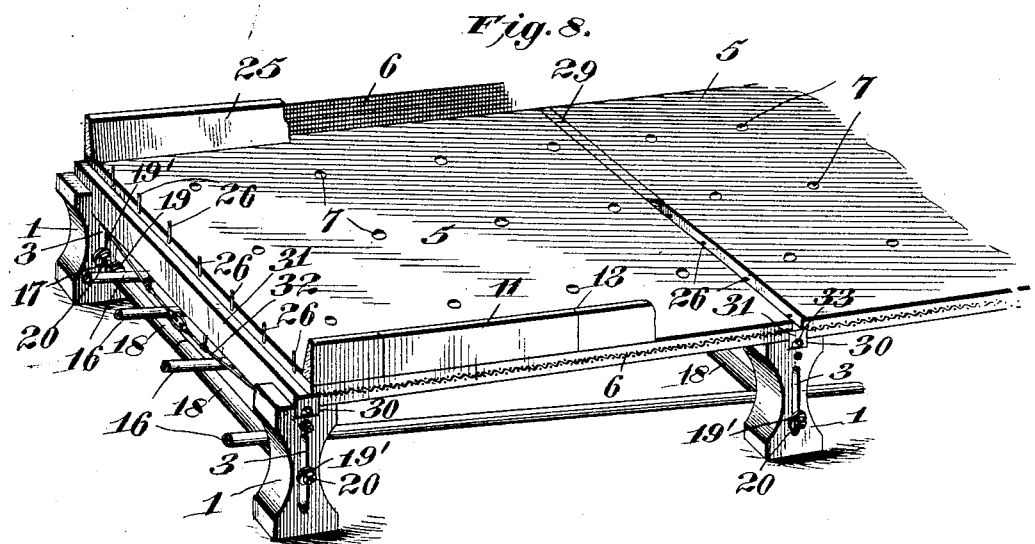
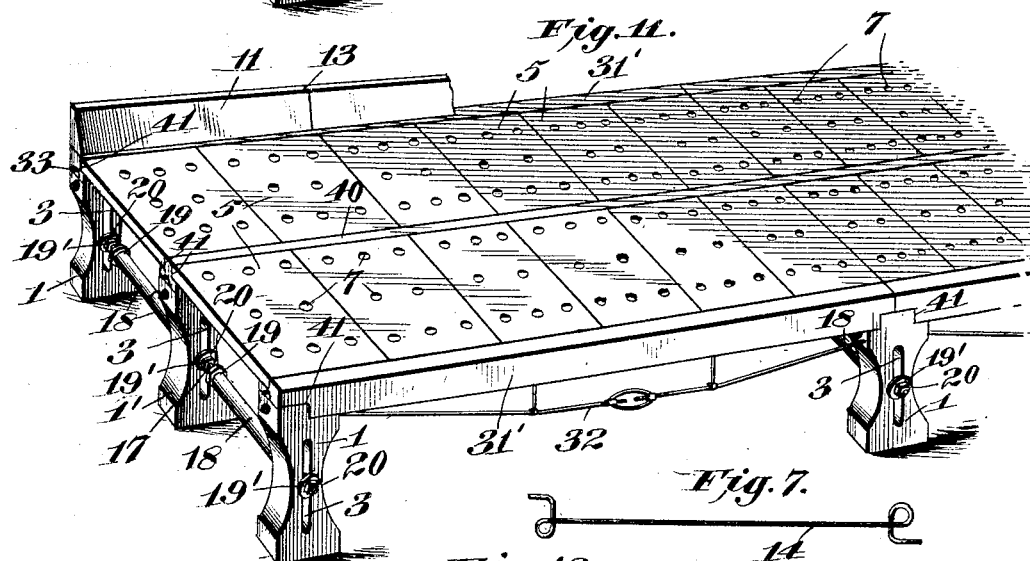
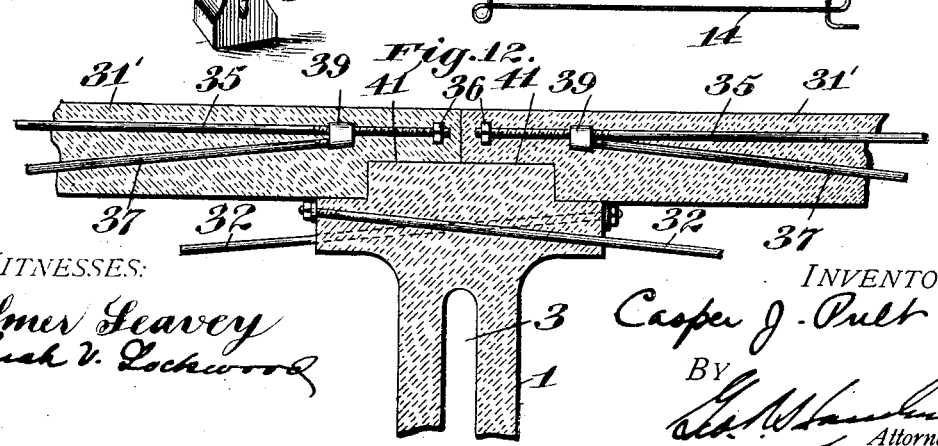

No. 784,756. PATENTED MAR. 14, 1905.
C. J. PULT.
FLORIST'S BENCH.
APPLICATION FILED MAY 24, 1904.
3 SHEETS—SHEET 3.
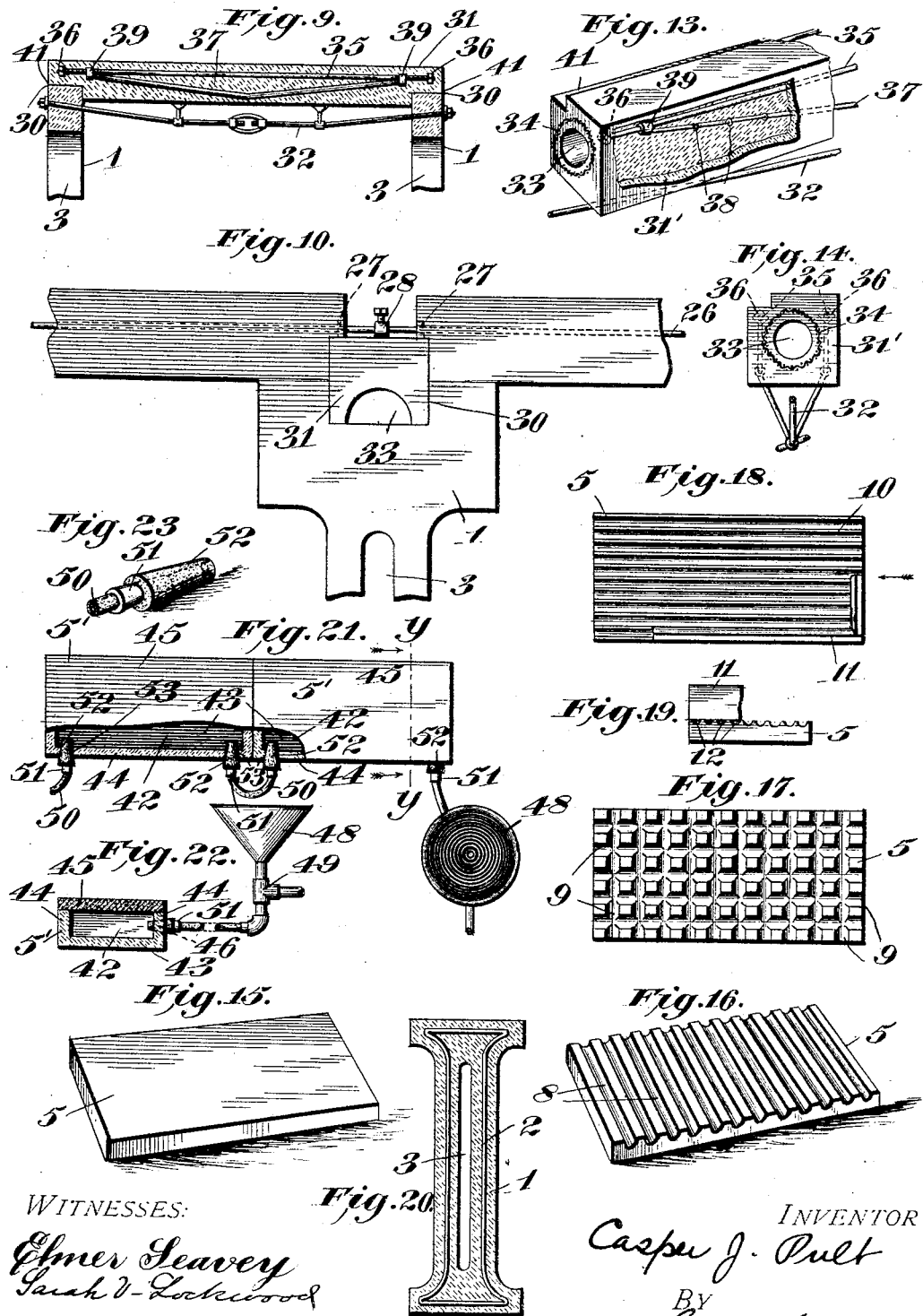
WITNESSES:
Elmer Seavey
Sarah V. Lockwood
INVENTOR
Casper J. Pult
By
Geo. ...
his Attorney No. 784,756. Patented March 14, 1905.

UNITED STATES PATENT OFFICE.

CASPER J. PULT, OF NORTH TONAWANDA, NEW YORK.

FLORIST'S BENCH.

SPECIFICATION forming part of Letters Patent No. 784,756, dated March 14, 1905.

Application filed May 24, 1904. Serial No. 209,506.

*To all whom it may concern:*

Be it known that I, CASPER J. PULT, a citizen of the United States, residing at North Tonawanda, county of Erie, and State of New York, have invented certain new and useful Improvements in Florists' Benches, &c., of which the following is a specification.

This invention relates to benches for florists, horticulturists, gardeners, &c., for use in growing plants and flowers.

The object of the present invention is the provision of an improved and novel bench of the class described which will be durable, comparatively inexpensive to construct, have provision for perfect and uniform drainage and distribution of moisture, easy to adjust and extend to different sizes, and which will be of great strength.

Further objects are to provide a bench of the class described which will prevent the dirt from escaping or air to enter the bed and dry the soil and wherein rusting or rotting of the parts or distortion through warping will be obviated.

I also aim to provide for drainage in an improved and novel manner, at the same time obviating clogging by the dirt, and also to make provision for irrigating and moistening the bed in a novel manner, so that the plant or flower growth can be forced when desired. In carrying out this idea it is my object to provide a novel construction of supporting-plate, whereby a plurality of plates can be employed and coupled for irrigating purposes in a novel manner and utilized to water or irrigate the bed.

The invention has for further objects the provision of improved means for trussing the bench when certain forms thereof are used, provide novel sides for the plates to form an improved basin for holding the dirt or bed, support heating-pipes in a peculiar and advantageous manner to accomplish adjustment, and provide for utilization of supplemental shelves for holding small plants or flowers, as well as otherwise providing novel means over florists' benches heretofore known to the art.

Some of the preferred embodiments of the invention are set forth fully hereinafter and the novel features are recited in the appended claims.

In the accompanying drawings, Figure 1 is a cross-sectional elevation taken through the legs. Fig. 2 is a perspective view of a portion of the bench of Fig. 1. Fig. 3 is a top plan of one of the side walls. Fig. 4 is a detail view of a portion of one of the shelves, showing the bracket thereunder; but it will be understood that said bracket is not connected to the shelf. Fig. 5 is a detail of the sleeve through which the roof-support passes. Fig. 6 is a detail of one of the ball-bearings for the sleeve supporting a heating-pipe. Fig. 7 is a detail of one of several rods which can be used as a substitute for the wire-netting embedded in the cement bed-plates of the construction shown in Figs. 1 and 2. Fig. 8 is a perspective view of a modified form of bench, illustrating at one side the form of wall shown in Figs. 1, 2 and 3, and at the other side a modified form of wall molded about the wire-netting, and also showing the space between adjoining bed-plates only partially filled with cement, this bench using transverse trussed braces. Fig. 9 is a longitudinal section through one of the transverse trussed braces of Fig. 8. Fig. 10 is a detail view showing the manner of supporting the trussed braces and plates of the construction shown in Fig. 8. Fig. 11 is a perspective view showing another modified form of bench where longitudinally-extending trussed braces are used and a number of bed-plates employed. Fig. 12 is a detail showing the manner of supporting the trussed braces of the construction shown in Fig. 11. Figs. 13 and 14 are details of the trussed brace construction which may be employed with the construction shown in either Fig. 8 or Fig. 11. Figs. 15, 16, and 17 are detail views showing the different forms the bed-plates may assume. Fig. 18 is a plan view of another form of bed-plate having longitudinal grooves and illustrating a section of the side walls. Fig. 19 is a detail end elevation taken in the direction of the arrow of Fig. 18. Fig. 20 is a detail illustrating how the cement legs may be reinforced. Fig. 21 is a detail plan view, partly broken away, illustrating an improved form of hollow plates which may be used for purposes of subirrigation, said plates being arranged to be coupled by hose and having porous tops. Fig. 22 is a view on line $y\,y$ of Fig. 21, and Fig. 23 is a detail view of the coupling connection for the pipe used in Figs. 21 and 22.

Referring first to Figs. 1, 2, 3, 4, and 20, the bench therein shown is preferable for use where the ground is of a swampy nature. The legs 1 are by preference of the form shown, having the broad base and top for purposes of strength and are of cement or concrete, being reinforced by the embedded ribbon 2, of metal, and provided with a vertical slot 3. The bottom of the basin, which holds the dirt bed 4, is composed of any desired number of plates or slabs 5, of cement or concrete by preference, having embedded therein a sheet of wire-netting 6 for the purposes of strength. To afford uniform drainage, the ports or openings 7 are provided, extending through the slabs 5 from top to bottom thereof and located at suitable intervals, said ports or openings being of a substantially downwardly-flared shape, preferably in the form of a hollow truncated cone, which prevents any clogging by the dirt and at the same time affords uniform and perfect drainage. Drainage may be effected in other ways than as above described, and I sometimes prefer to provide slabs or plates 5 with grooves or channels in their upper faces. These channels may run transversely, as shown in Fig. 16 at 8, or both transversely and longitudinally of the slab or plate 5, as shown at 9 in Fig. 17, or they may only run longitudinally of the slab, as shown at 10 in Fig. 18, in which case the ends 12 of the grooves run under the walls or sides 11. The sides or walls 11 are of cement or concrete and made in sections with interlocking ends 13, which after the sections are placed in position are cemented together and the sections themselves cemented to the plates or slabs 5. A basin is thus formed for holding the bed 4. By preference the walls 11 are of general triangular form in cross-section. The plates 5 may all have the strengthening-netting or only some of said plates and others may be provided with strengthening-rods 14 like that shown in Fig. 7 embedded therein. Where I desire to support a roof over the bench, a cement collar 15, which may be in either one piece or in two pieces, is cemented to a slab or plate 5 for the roof-supporting member to pass through. Said member would also pass through the slab or plate 5 and be connected to the roof, the collar 15 preventing moisture from having access to said roof-supporting member and preventing it from coming in contact with the dirt bed 4. To provide a convenient means for adjustably supporting the heating-pipes 16, I provide braces 17 in the shape of rods, on which the pipes 16 rest, and, if desired, a sleeve 18, with ball-bearings 19 interposed between it and the rod 17, may be used to better accommodate the expansion and contraction of the heating-pipes 16. The ends of the braces 17 pass through the slots 3 and can be made long enough to support shelves, if desired. On the braces 17 and on opposite sides of the legs are circular washers 19'. Nuts 20 are provided on the braces 17 to clamp the washers 19' against the legs, thereby holding the braces secure. Provision is thus made for raising or lowering the braces and for adjusting the inclination of the heating-pipes. For supporting small plants and flowers the shelves 21 are provided, each being of concrete or cement and formed in substantially the same way as the bottom 5 and walls 11 of the bench, except that the shelf 21 is made in one length instead of a plurality of sections. It can be reinforced with embedded netting or rods, as desired. To support the shelves 21, one or more of which can be employed on the legs at the two sides of the bench, the brackets 22 are used, on which the shelf rests, said brackets having double jaws 23, which embrace the leg 1 and are held thereto at any desired height by set-screw 24. As many shelves and brackets at different heights can be used as desired. I can make the supporting-framework for the bench of wood in some instances, the legs thereof being braced in any well-known fashion.

Where a bench of considerable width with no obstruction below it is desired, the invention can be carried out as shown in Figs. 8, 9, 10, 13, and 14. The plates or slabs 5 are here of considerable width and provided with the strengthening-netting 6. The slabs 5 are made in sections placed end to end to constitute the bench and in forming the side walls 11. They can be made, as heretofore described, in sections or by extending the edge of the netting 6 laterally from the slab 5 and bending it up vertically and molding cement or concrete 25 therearound. To prevent the bench from spreading and to strengthen it, in this form of the invention, I prefer to embed rods or cables 26 in the plates 5 below the netting 6 and provide on said rods or cables, at the end portions thereof, nuts 27, which are embedded in the plate 5. The extended ends of the cables, on adjoining plates 5 are connected by screw-clamps 28. A number of these cables or rods are employed in each plate 5, the same being located side by side at different points considered crosswise of the plate, and the ends are connected by the clamps 28 with the corresponding cable or rod ends on the adjoining section 5. The bench is thus made capable of extension as desired by adding more sections. The space between adjacent ends of adjoining sections is filled with cement or concrete after the cable ends have been connected, as shown at 29. The sections are supported by legs 1 of substantially the same construction as heretofore described, except that they have notches 30 on their tops which receive the ends of the braces 31. (Shown in detail in Fig. 10.) These braces are provided with the trusses 32 below the same, the ends of said trusses passing through the upper ends of the legs 1. The cut-out ends of the braces 31 rest in the notches 30. The braces 31 are of cement or concrete and hollow, as shown at 33. The hollow portion thereof is surrounded by a substantial cylinder of wire-netting 34. To strengthen the brace in the smaller sizes, a single rod 35 can be used, the same being provided with nuts 36, embedded in the cement brace 31. A metal cable 37, provided with protuberances or knots 38, is embedded in the cement brace and has the connection 39 with the rod 35. In the larger sizes of brace two of the rods and two of the cables will be used, the same being located on opposite sides of the hollow part 33. It will be seen, therefore, that both an internal and external trussing effect is obtained. The heating-pipes and adjustable braces 17 are used as before.

Referring now to Figs. 11 and 12, I have here shown the manner in which the invention can be carried out where a long narrow bench is desired and no shelving is required and a good foundation is obtainable. The legs 1 are of substantially the same construction as heretofore set forth, except that the manner of notching the upper ends thereof is altered to suit the modified arrangement of the trusses, which extend lengthwise of the bench instead of transversely thereto, as before. The trussed-brace construction is similar to that heretofore set forth. In this form of the invention not only outer longitudinally-extending trussed braces 31' are used, but extra legs 1', located along the longitudinal median line of the bench, are used, and braces 40 are supported thereby, said braces, as well as the side braces, having rabbets 41. The plates 5 instead of extending the full width of the bench are arranged in sets of less than one-half the width of the bench and rest in the rabbets 41. All the parts are cemented together, so that all cracks are filled. The plates are provided with openings for drainage, as before described, or these plates may have the grooves, if preferred.

Referring now to Figs. 21, 22, and 23, I have here shown how the plates 5' can be adapted for subirrigation of the bed where it is desired to force the plant or flower growth, and only a very mild moist heat is desired. The plates 5' are made with hollow interior 42, and the bottom 43 and sides 44 are of hard composition; but the top 45 is of a porous composition, which will permit the water to percolate through into the bed. The plates can be provided with the exterior grooves 8, 9, or 10, as shown in one instance, or with the ports 7, as shown in another instance, to accomplish the function of drainage without clogging heretofore set forth. These plates can be of any desired size and arranged to be added one to the other as needed. One or more of them is provided with an inlet-opening 46, communicating with any means, such as a funnel or reservoir 48, for water, the flow of which can be controlled by valve 49. Successive plates 5' are placed in further communication by a flexible pipe 50, provided at its ends with tapered plugs 51, fitted into rubber couplings 52, which are forced into the openings 53 in the plates 5'. A convenient means of quickly and easily coupling the plates together or uncoupling them is thus provided. It will be understood that the plugs 51 carry the rubber cables 52, and when it is desired to couple two of the plates the tubes 52 are forced into the openings 53. Water of any desired temperature can thus be fed into the plates and will pass up through the porous upper surfaces 45 thereof and afford the mild moist heat necessary when it is desired to extremely force the plant or growth.

It is preferable to make the side walls, the trussed braces, and the legs of the bench of such composition that they will be white to conform to the interior white painting of the greenhouse, and thus obtain as much light as possible.

The advantages of the present invention will be obvious. The composition of concrete construction retains the moisture, and there are no iron parts to rust nor any wooden parts to rot or break apart. The bench can be extended as desired and the heating-pipes adjusted to proper position. It will also be noted that the arrangement for drainage insures the best results from use, and clogging by the dirt is prevented. The construction of hollow plates for subirrigation purposes I consider a very valuable improvement.

Having thus described my invention, what I claim as new, and desire to secure by Letters Patent, is—

1. In a bench for florists and others, the combination with legs, of trussed braces whose ends are supported by said legs, and a bed-bottom resting on said trussed braces.

2. In a bench for florists and others, the combination with cement or concrete legs, of trussed braces of cement or concrete whose ends are supported by said legs, and a cement or concrete bed-bottom resting on said trussed braces.

3. In a bench for florists and others, the combination with legs, of trussed braces whose ends are supported by said legs, said trussed braces having rods anchored in the legs whereby the braces are tied to said legs, and a bed-bottom resting on said trussed braces.

4. In a bench for florists and others, a bed support or bottom comprising a plurality of aggregated molded sections placed end to end having reinforcing members embedded therein, the free ends of said reinforcing members of one section being connected to the free ends of the members of the other section to connect the sections together and prevent their separation at their adjoining edges, and means for sustaining said bed-bottom.

5. In a bench for florists and others, a bed support or bottom comprising a plurality of aggregated molded sections placed end to end having reinforcing members embedded therein, the free ends of said reinforcing members of one section being connected to the free ends of the members of the other section to connect the sections together and prevent their separation at their adjoining edges, trussed braces supporting said bed-bottom, and legs supporting the ends of the trussed braces.

6. In a bench for florists and others, a bed-support comprising a bed-bottom of cement or concrete, reinforced cement or concrete trussed braces for said bed-bottom, and cement or concrete legs for supporting the said trussed braces.

7. In a bench for florists and others, the combination with a bed-support and legs, of a brace for said bed-support, said brace resting on the legs and having an internal truss and an external truss.

8. In a bench for florists and others, a bed-support comprising a bed-bottom and braces for said bed-bottom, said braces having an internal rod, a cable connected at its ends to said rod and acting, in connection with said rod, as a truss for the brace, said cable having projections thereon.

9. In a bench for florists and others, a bed-support comprising a bed-bottom and hollow braces for said bed-bottom, said hollow braces having embedded therein wire-netting, a rod, and a cable arranged in truss-like form in relation to the rod, said cable having protuberances.

10. In a bench for florists and others, the combination with a bed-bottom of cement or concrete, of a sleeve or collar of non-metallic material cemented to the bed bottom or support in a general upright position so as to be adapted to receive a supporting-pole for the roof over said bench.

11. In a bench for florists and others, the combination with a bed-support and stationary legs rigidly connected to said bed-support, of braces connecting the legs, sleeves rotatably mounted on the braces, and heating-pipes resting on the sleeves.

12. In a bench for florists and others, the combination with the bench-legs, of brackets adjustable up and down relatively to said legs and a shelf supported by said brackets.

13. In a bench for florists and others, the combination with bench-legs, of brackets having jaws embracing said legs, clamping means for securing the jaws to the legs in adjustable manner to permit the brackets to be slid up and down on the legs, and a shelf supported by said brackets.

14. In a bench for florists and others, a bed-support having vertically-disposed drainage-openings extending therethrough from top to bottom which flare from their upper portions downwardly to prevent clogging by the dirt in the bed.

In testimony whereof I hereunto affix my signature in presence of two witnesses.

CASPER J. PULT.

Witnesses:
ELIAS ROOT,
CHAS. S. ORTON.